United States Patent
Okada

(10) Patent No.: US 11,341,793 B2
(45) Date of Patent: May 24, 2022

(54) COMMUNICATION DEVICE, COMMUNICATION SYSTEM AND COMMUNICATION METHOD

(71) Applicant: TOYOTA JIDOSHA KABUSHIKI KAISHA, Toyota (JP)

(72) Inventor: Hiroki Okada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/789,772

(22) Filed: Feb. 13, 2020

(65) Prior Publication Data

US 2020/0327752 A1    Oct. 15, 2020

(30) Foreign Application Priority Data

Apr. 10, 2019   (JP) .............................. JP2019-074881

(51) Int. Cl.
| | | |
|---|---|---|
| *B60R 25/40* | (2013.01) | |
| *B60R 25/24* | (2013.01) | |
| *H04W 4/80* | (2018.01) | |
| *G07C 9/00* | (2020.01) | |
| *H04W 4/40* | (2018.01) | |

(Continued)

(52) U.S. Cl.
CPC ...... *G07C 9/00309* (2013.01); *B60R 25/1001* (2013.01); *B60R 25/209* (2013.01); *B60R 25/2072* (2013.01); *H04W 4/40* (2018.02); *H04W 4/80* (2018.02); *B60R 2325/10* (2013.01); *G07C 2009/00365* (2013.01)

(58) Field of Classification Search
CPC ..... B60R 2011/0061; B60R 2011/0073; B60R 11/02; B60R 2011/0075; B60R 25/245; B60R 25/01; B60R 25/24; B60R 2325/101; B60R 25/20; B60R 25/209; B60R 25/241; B60R 25/40; H04B 1/3822; H04B 1/69; H04B 2201/70715; H04L 61/6022; H04L 63/0876; H04M 1/04; H04M 1/6075; H04M 1/72463; H04W 12/068; H04W 4/40; H04W 4/48; H04W 12/122; H04W 4/80; H04W 12/069; H04W 88/06; G07C 2009/00365; G07C 2009/00555; G07C 9/00309; G07C 2209/63; G07C 2009/00373; G07C 2009/00547; G07C 9/00; G07C 9/29; E05B 81/54; E05B 81/78; G01S 13/0209
See application file for complete search history.

(56) References Cited

U.S. PATENT DOCUMENTS

| | | | | |
|---|---|---|---|---|
| 9,132,805 | B1 * | 9/2015 | King | ...................... B60R 25/23 |
| 10,857,977 | B1 * | 12/2020 | Lacroix | .................. H04W 4/40 |

(Continued)

FOREIGN PATENT DOCUMENTS

| | | |
|---|---|---|
| JP | 2018-020611 A | 2/2018 |
| JP | 2018-145748 A | 9/2018 |

*Primary Examiner* — Dionne Pendleton
(74) *Attorney, Agent, or Firm* — Oliff PLC

(57) ABSTRACT

A communication device mounted at a vehicle, the communication device including: a blocking section that, in a case in which communication with a second mobile device that is different from a first mobile device that transmits key information for the vehicle is interrupted, performs a blocking process to block an unlocking of the vehicle or a starting of the vehicle that is performed based on received key information.

15 Claims, 15 Drawing Sheets

(51) Int. Cl.
*B60R 25/10* (2013.01)
*B60R 25/20* (2013.01)

(56) References Cited

U.S. PATENT DOCUMENTS

| | | | |
|---|---|---|---|
| 2014/0282877 A1* | 9/2014 | Mahaffey | H04W 12/08 |
| | | | 726/3 |
| 2017/0104865 A1* | 4/2017 | Skelton | H04B 1/3822 |
| 2017/0136990 A1 | 5/2017 | Tercero | |
| 2017/0236351 A1 | 8/2017 | Menard et al. | |
| 2018/0261027 A1* | 9/2018 | Fujiwara | H04L 9/0816 |
| 2018/0276926 A1 | 9/2018 | Hayashi | |
| 2019/0340857 A1* | 11/2019 | Geier | B60R 25/241 |
| 2022/0063561 A1* | 3/2022 | Vijithakumara | G07C 9/00309 |

* cited by examiner

DISCONNECT CONNECTOR

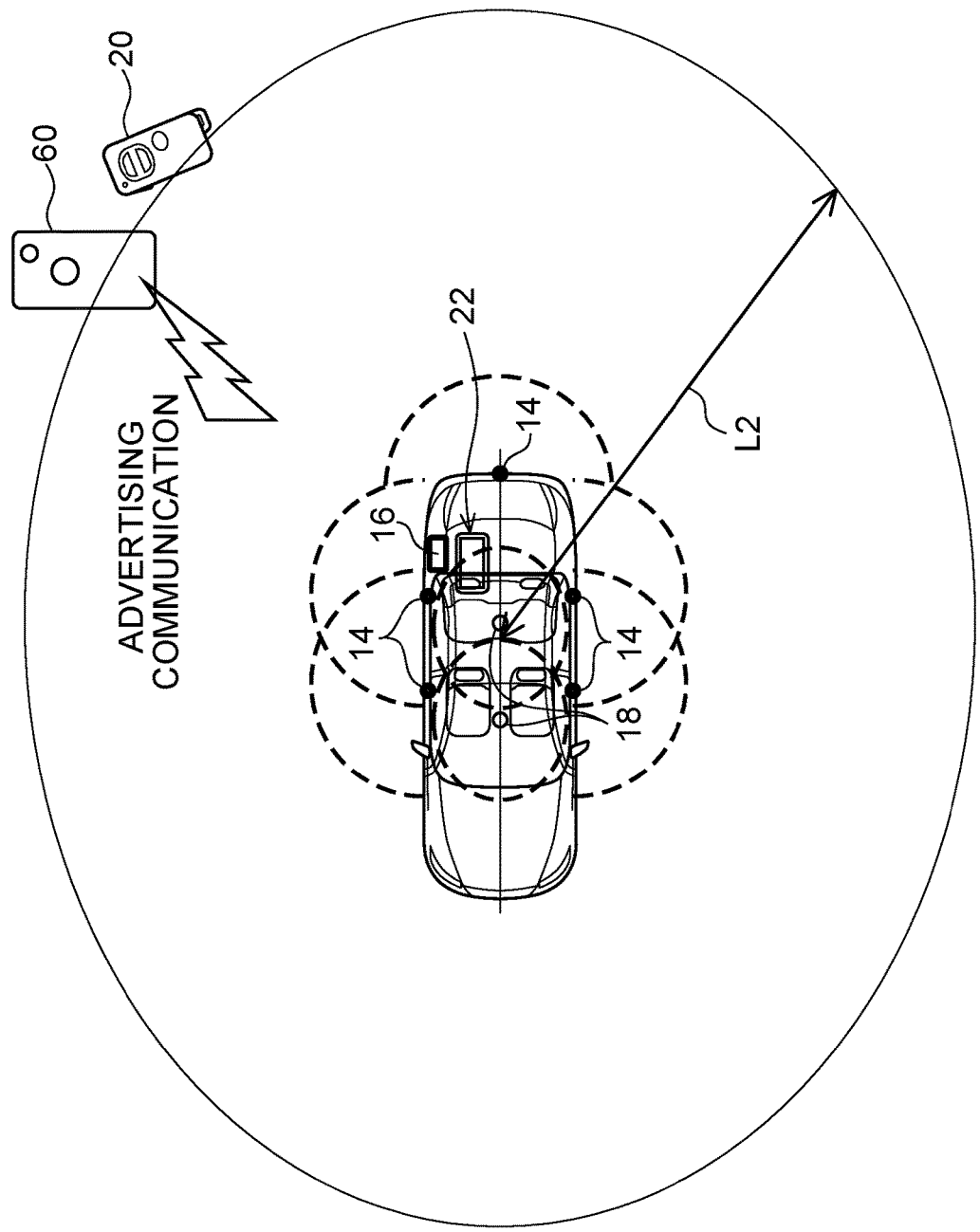

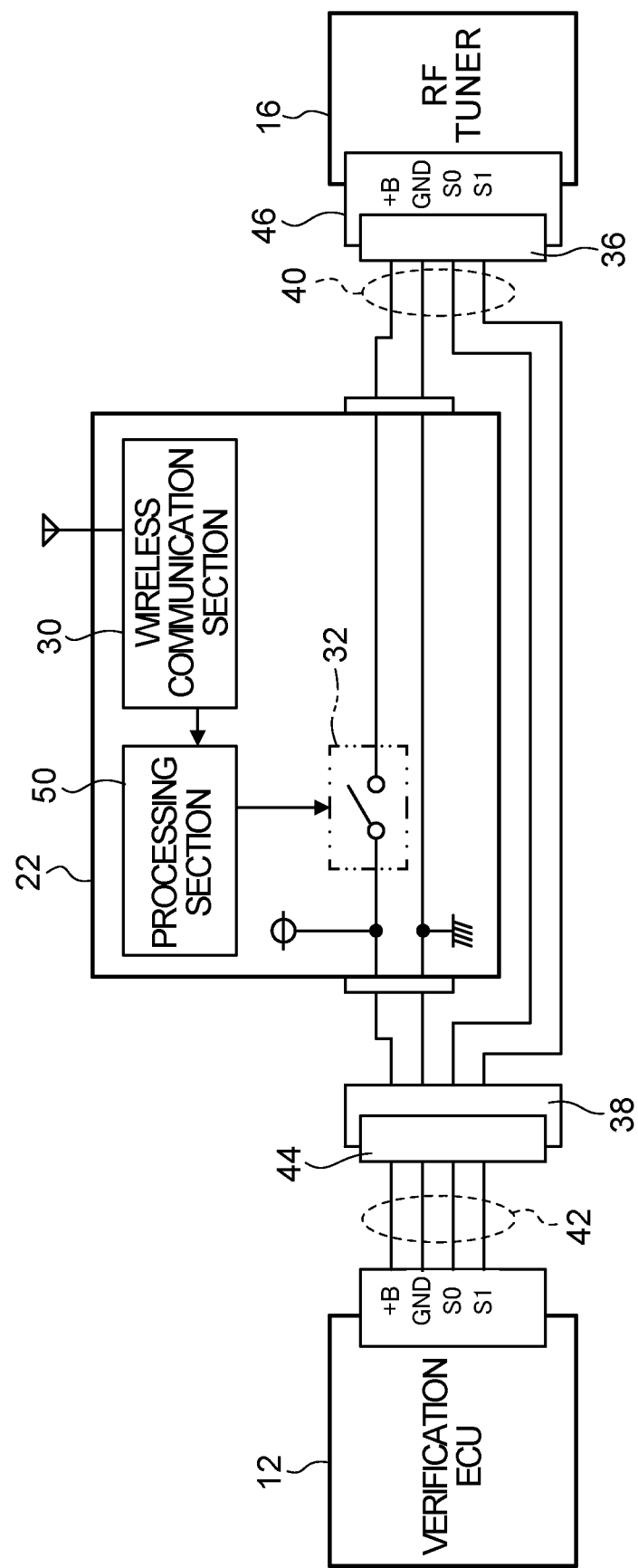

FIG.12
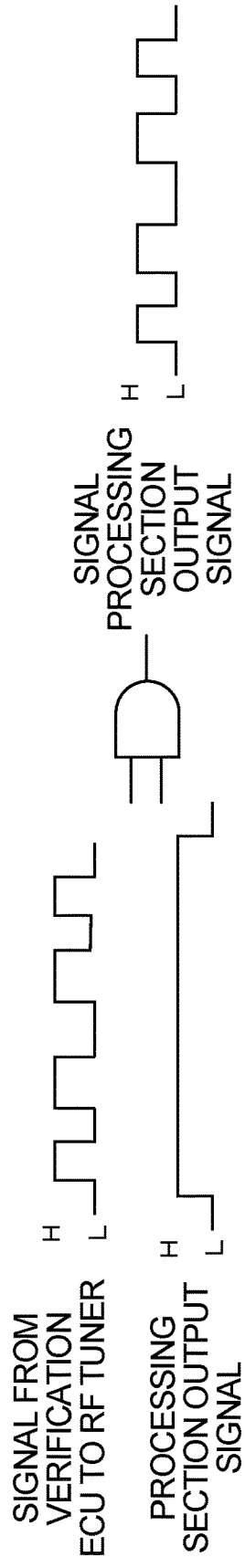
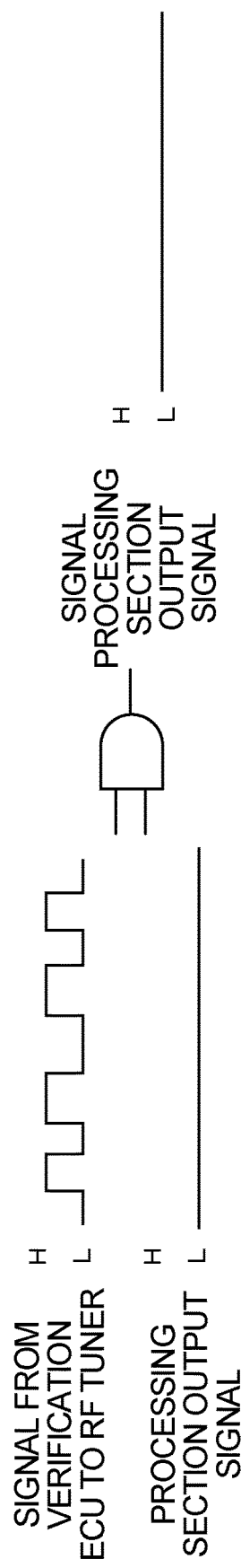

COMMUNICATION DEVICE, COMMUNICATION SYSTEM AND COMMUNICATION METHOD

CROSS-REFERENCE TO RELATED APPLICATION

This application is based on and claims priority under 35 USC 119 from Japanese Patent Application No. 2019-074881, filed on Apr. 10, 2019, the disclosure of which is incorporated by reference herein.

BACKGROUND

Technical Field

The present disclosure relates to a communication device, a communication system, and a communication method.

Related Art

In technology described in Japanese Patent Application Laid-Open (JP-A) No. 2018-020611, a response time from when a request signal is transmitted toward a mobile device until when an answer signal transmitted by that mobile device in response to the request signal is received, is measured. If this response time is shorter than a threshold time that has been associated with identification information contained in the answer signal and stored in memory, then a door is unlocked. If, however, the response time is longer than the threshold time, the door is not unlocked.

In a relay attack in which a stranger (namely, a person other than the user of the vehicle) illegally relays radio waves of a mobile device, the response time is lengthened by an amount corresponding to the time required to relay the radio waves using a repeater device. In the technology described in JP-A No. 2018-020611, this fact is used in order to determine whether a relay attack is occurring. However, there is only a slight difference in the response times between when a mobile device is being used legally and when a relay attack is occurring.

For example, if the communication distance when a mobile device is being used legally is taken as 1 [m], then the response time is:

$$1 \text{ [m]}/3 \times 10^8 \text{ [m/sec]} \times 2 \text{ (for both directions)} = 6.6 \text{ [n sec]}.$$

In contrast, if the communication distance when a relay attack is occurring is taken as 10 [m], then the response time is:

$$10 \text{ [m]}/3 \times 10^8 \text{ [m/sec]} \times 2 \text{ (for both directions)} = 66 \text{ [n sec]}.$$

Accordingly, the difference in the response times between when a mobile device is being used legally and when a relay attack is occurring is no more than 60 [n sec] in the foregoing example, so that accurately determining whether or not a relay attack is occurring from differences in response times is difficult.

SUMMARY

The present disclosure provides a communication device, a communication system, and a communication method that may inhibit the unlocking of a vehicle or the starting of a vehicle as a result of radio waves from a first mobile device which transmits key information for the vehicle being relayed.

A first aspect of the present disclosure is a communication device mounted at a vehicle, the communication device including: a blocking section that, in a case in which communication with a second mobile device that is different from a first mobile device that transmits key information for the vehicle is interrupted, performs a blocking process to block an unlocking of the vehicle or a starting of the vehicle that is performed based on received key information.

In the first aspect, when communication with a second mobile device is interrupted, because the unlocking of the vehicle and the starting of the vehicle based on key information are blocked, preconditions for the vehicle to be unlocked or for the vehicle to be started are that, in addition to key information being received, communication with a second mobile device is not interrupted. As a result, the first aspect of the present disclosure may inhibit the unlocking of a vehicle or the starting of a vehicle as a result of radio waves from a first mobile device which transmits key information for the vehicle being relayed.

In a second aspect of the present disclosure, in the first aspect, in a case in which communication with the second mobile device is interrupted, the blocking section may perform, as the blocking process, any one of shutting off power, shutting off a signal, or processing a signal, in at least one of a receiving device that receives the key information, a verification device that verifies the key information, a first control device that controls unlocking and locking of the vehicle, or a second control device that controls starting of the vehicle.

In the second aspect, the present disclosure may be implemented by simply adding the communication device without having to alter the configurations of the existing receiving device, verification device, first control section, or second control section.

In a third aspect of the present disclosure, in the first or second aspects, in a case in which a power supply of the vehicle is switched from an OFF state to an ON state without the blocking process having been performed, the blocking section may stop the blocking process from being performed until the power supply of the vehicle has been switched from the ON state to the OFF state.

In the third aspect, because communication with the second mobile device was not interrupted, if the communication with the second mobile device is interrupted due to another cause after the power supply of the vehicle has been switched from an OFF state to an ON state without the blocking section performing the blocking processing, then irrespective of the state of the communication with the second mobile device, the blocking processing is not performed until the power supply of the vehicle is switched from the ON state to the OFF state.

In a fourth aspect of the present disclosure, in the second aspect, the communication device may be provided between the verification device and at least one of the receiving device, the first control device, or the second control device.

According to the fourth aspect, it is possible to shorten the length of a wire harness that is used to add the communication device according to the present disclosure.

A fifth aspect of the present disclosure, in the fourth aspect, may further include: a first connector that is used to connect to one of the receiving device, the first control device, or the second control device; and a second connector that is used to connect to the verification device.

According to the fifth aspect, the communication device according to the present disclosure may be provided by performing the simple operation of replacing connectors.

In a sixth aspect of the present disclosure, in any one of the first through fifth aspects, a communicable distance with the second mobile device may be greater than a communicable distance with the first mobile device.

In the sixth aspect, a situation arising in which a vehicle is not unlocked or in which a vehicle is not started because of communication with the second mobile device being interrupted in spite of the fact that key information is being received directly from the first mobile device, may be prevented.

In a seventh aspect of the present disclosure, in any one of the first through sixth aspects, communication with the second mobile device may be performed via BLE (Bluetooth (registered trademark) Low Energy).

BLE is an energy saving communication format and, according to the seventh aspect, an extension in the life of a battery mounted in the second mobile device may be achieved.

An eighth aspect of the present disclosure is a communication system including: a first mobile device that transmits key information for a vehicle; a second mobile device that performs different communication from that performed by the first mobile device; and a communication device that is mounted at the vehicle and includes a blocking section that, when communication with the second mobile device is interrupted, blocks an unlocking of the vehicle or a starting of the vehicle that is performed based on received key information.

As a consequence, in the same way as the first aspect, the eighth aspect of the present disclosure may inhibit the unlocking of a vehicle or the starting of a vehicle as a result of radio waves from a first mobile device which transmits key information for the vehicle being relayed.

In a ninth aspect of the present disclosure, in the eighth aspect, the second mobile device may include a control section that stops communication with the communication device when a predetermined condition has been satisfied.

As a result of a period of time occurring in which communication with the communication device is stopped, the ninth aspect may inhibit the unlocking of a vehicle or the starting of a vehicle that might be enabled as a result of radio waves from the second mobile device being relayed in addition to the radio waves from the first mobile device.

In a tenth aspect of the present disclosure, in the ninth aspect, the control section may stop communication with the communication device when a predetermined button at the second mobile device is operated.

In the tenth aspect, as a result of a user operating a predetermined button, communication with the communication device may be stopped at a desired timing.

In an eleventh aspect of the present disclosure, in the ninth aspect, the second mobile device may further include a displacement detecting section that detects a displacement of the second mobile device, and the control section may stop communication with the communication device when a state in which a displacement of the second mobile device is not detected by the displacement detecting section continues for a predetermined time or greater.

In the eleventh aspect, if a user is inactive, such as, for example, when the user is asleep, because button operations and the like are not required, communication with the communication device may be automatically stopped.

In a twelfth aspect of the present disclosure, in the ninth aspect, the control section may stop communication with the communication device during a predetermined time period.

In the twelfth aspect, because button operations and the like are not required during time periods when a user is not using a vehicle, such as, for example, at night time and the like, communication with the communication device may be automatically stopped.

In a thirteenth aspect of the present disclosure, in any one of the eighth through twelfth aspects, the second mobile device may be a smartphone.

A smartphone may be capable of functioning as a control section as a result of an application being executed. Moreover, because it is typical for a smartphone to also include a communication section capable of performing BLE-based communication, and a sensor that is capable of functioning as a displacement detecting section, a smartphone may be used as the second mobile device.

A fourteenth aspect of the present disclosure is a communication method including: in a case in which communication between a vehicle and a second mobile device that is different from a first mobile device that transmits key information for the vehicle is interrupted, blocking an unlocking of the vehicle or a starting of the vehicle that is performed based on received key information.

As a result, in the same way as in the first aspect, the fourteenth aspect of the present disclosure may inhibit the unlocking of a vehicle or the starting of a vehicle as a result of radio waves from a first mobile device which transmits key information for the vehicle being relayed.

According to the above-described aspects, the communication device, communication system, and communication method of the present disclosure may inhibit the unlocking of a vehicle or the starting of a vehicle as a result of radio waves from a first mobile device which transmits key information for the vehicle being relayed.

BRIEF DESCRIPTION OF THE DRAWINGS

Exemplary embodiments of the present disclosure will be described in detail based on the following figures, wherein:

FIG. 4 is a plan view illustrating a communicable range of a wireless communication section of a communication device;

FIG. 5 is a schematic structural view of a communication device according to the first exemplary embodiment;

FIG. 12 is an explanatory view illustrating operations of a signal processing section;

DETAILED DESCRIPTION

Hereinafter, examples of exemplary embodiments for implementing the present disclosure will be described in detail with reference to the drawings.

First Exemplary Embodiment

Figure 1:
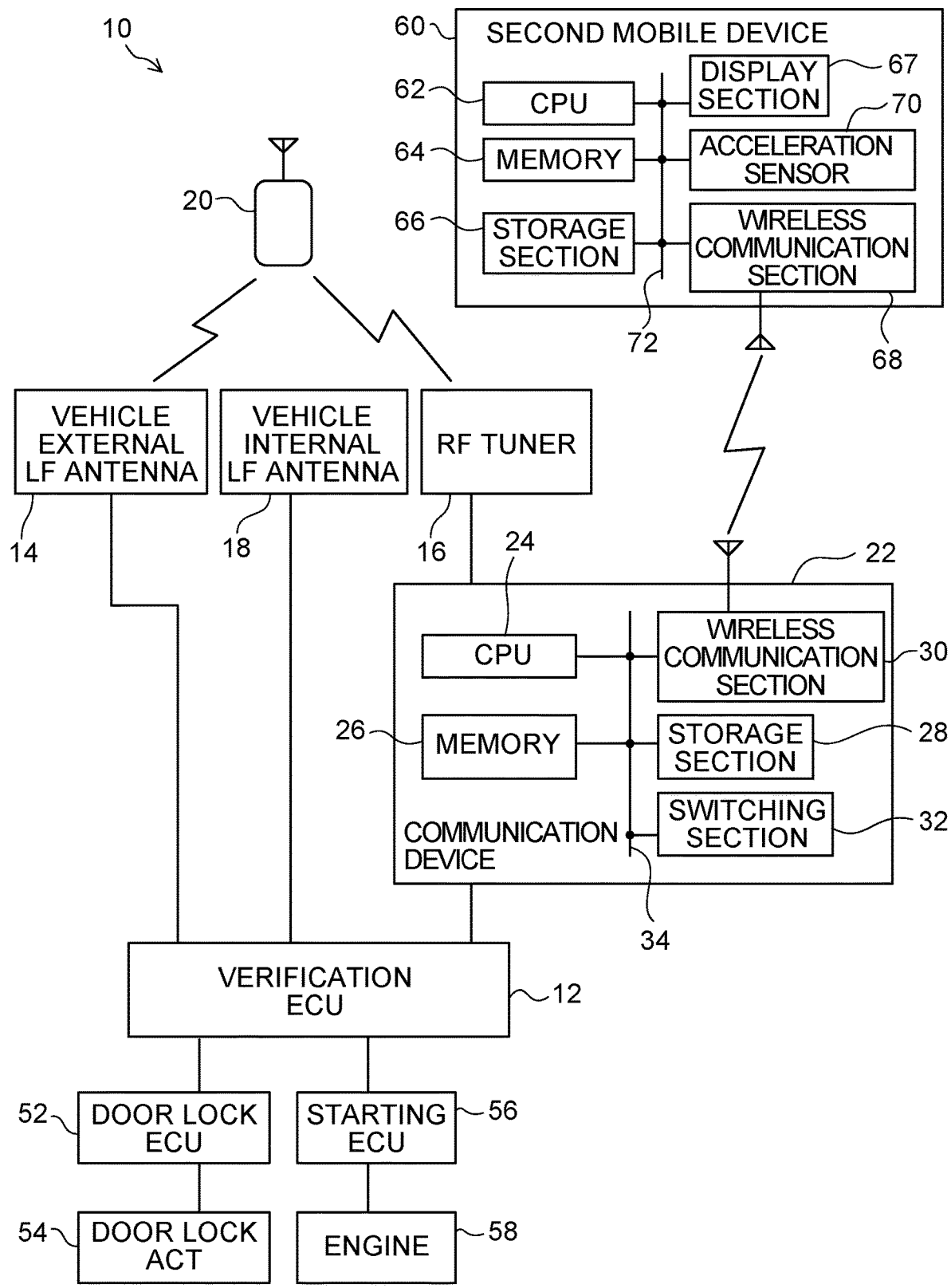
FIG. 1 is a block diagram illustrating a schematic configuration of a vehicle on-board system according to a first exemplary embodiment.

A vehicle on-board system 10 illustrated in FIG. 1 includes a verification ECU (Electronic Control Section) 12, a communication device 22, a door lock ECU 52, and a starting ECU 56. Note that the verification ECU 12 is an example of a verification device, the door lock ECU 52 is an example of a first control device, and the starting ECU 56 is an example of a second control device.

The verification ECU 12 includes a CPU (Central Processing Section), memory such as ROM (Read Only Memory) and RAM (Random Access Memory), a non-volatile storage section such as an HDD (Hard Disk Drive) or an SSD (Solid State Drive), and a communication I/F (Interface). Vehicle external LF (Low Frequency) antennas 14, an RF (Radio Frequency) tuner 16, and vehicle internal LF antennas 18 are respectively connected to the verification ECU 12.

Figure 2:
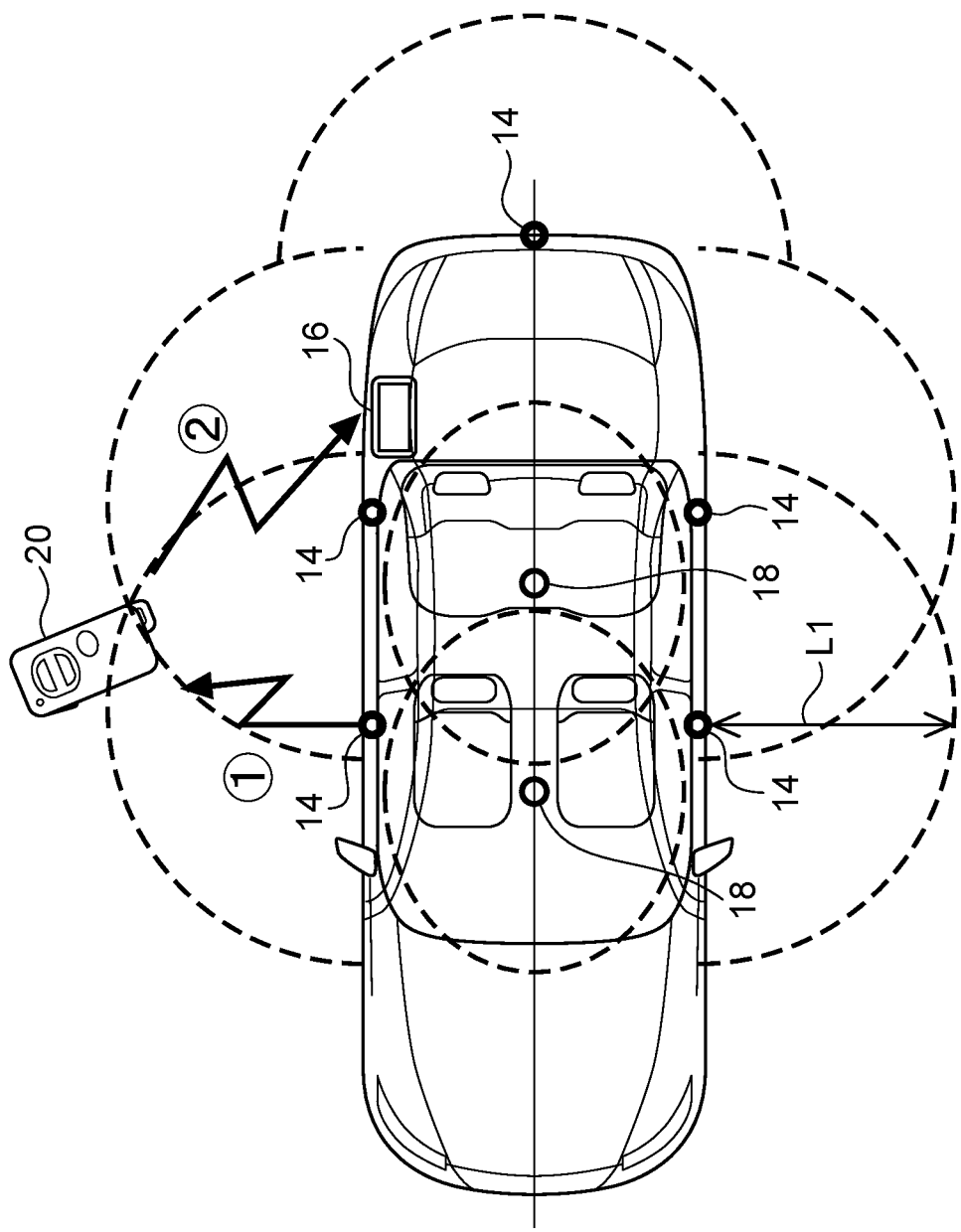
FIG. 2 is a plan view illustrating placements and communicable ranges of vehicle external LF antennas and vehicle internal LF antennas.

As is illustrated in FIG. 2, the respective vehicle external LF antennas 14 are individually provided in plural locations on the vehicle exterior, and transmit predetermined radio waves to a first mobile device 20 held by a user. When the user holding the first mobile device 20 is present externally of the vehicle and also within a predetermined distance L1 from any one of the vehicle external LF antennas 14, the first mobile device 20 receives the predetermined radio waves transmitted from the vehicle external LF antenna 14, and transmits key information previously stored in the first mobile terminal 20. This key information transmitted from the first mobile device 20 is received by the RF tuner 16. Note that the predetermined distance L1 is, for example, 1 m, and an example of the first mobile device 20 is a smart key.

The vehicle internal LF antennas 18 and the RF tuner 16 are provided in the vehicle interior, and the vehicle internal LF antennas 18 transmit predetermined radio waves to the first mobile device 20. When the user holding the first mobile device 20 is present inside the vehicle cabin, the first mobile device 20 receives the predetermined radio waves transmitted from the vehicle internal LF antennas 18, and transmits key information. This key information transmitted from the first mobile device 20 is received by the RF tuner 16. Note that the RF tuner 16 is an example of a receiving device.

When the RF tuner 16 receives the key information from the first mobile device 20, and notification that this key information has been received is issued by the RF tuner 16, the verification ECU 12 verifies the notified key information against previously registered key information. If the notified key information matches previously registered key information, the verification ECU 12 issues a positive verification notification to the door lock ECU 52 if the transmission source of the predetermined radio waves was a vehicle external LF antenna 14. If the transmission source of the predetermined radio waves was a vehicle internal LF antenna 18, then the verification ECU 12 issues a positive verification notification to the starting ECU 56.

Figure 3A:
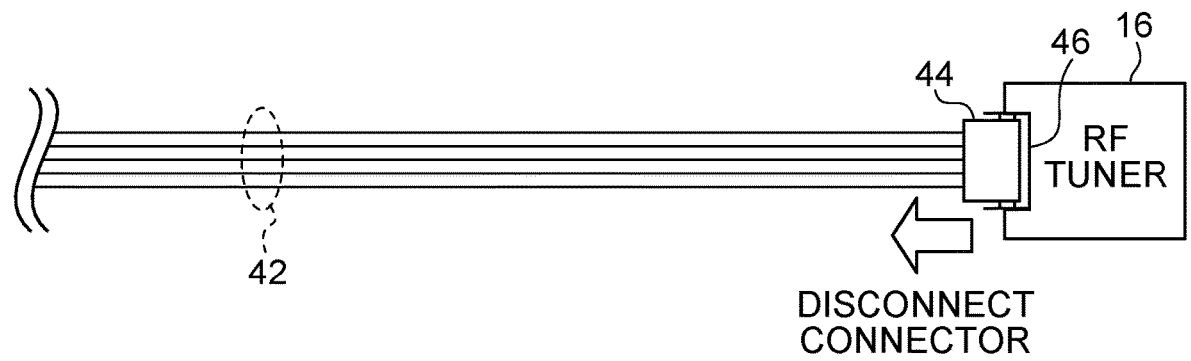
FIG. 3A is a schematic view illustrating an operation of adding a communication device.
Figure 3B:
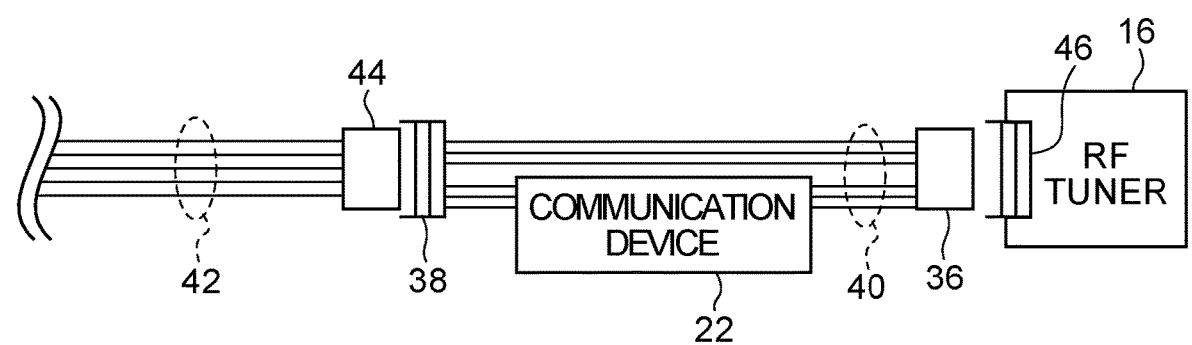
FIG. 3B is a schematic view illustrating an operation of adding a communication device.

As illustrated in FIG. 1, the communication device 22 is provided between the verification ECU 12 and the RF tuner 16. As illustrated in FIG. 3B, the communication device 22 is provided partway along a wire harness 40 at one end of which is provided a first connector 36, and at another end of which is provided a second connector 38. As is illustrated in FIG. 3A, a connector 44 is provided at a distal end portion of a wire harness 42 that extends from the verification ECU 12. When the communication device 22 is not provided, the connector 44 is connected to a connector 46 provided in the RF tuner 16.

The addition of the communication device 22 between the verification ECU 12 and the RF tuner 16 is achieved by releasing the connection between the connector 44 and the connector 46 (see FIG. 3A), and then connecting the first connector 36 to the connector 46 of the RF tuner 16, and connecting the second connector 38 to the connector 44 (see FIG. 3B).

As is illustrated in FIG. 1, the communication device 22 includes a CPU 24, memory 26 such as ROM and RAM, a non-volatile storage section 28 such as an HDD or SSD, a wireless communication section 30, and a switching section 32. The CPU 24, memory 26, storage section 28, wireless communication section 30, and switching section 32 are connected together to mutually communicate with each other via an internal bus 34.

A program that performs wireless switching processing (described below) is stored in the storage section 28. This program is read from the storage section 28 and preliminarily expanded in the memory 26, and is then executed by the CPU 24. As a consequence, the CPU 24 functions as a processing section 50 illustrated in FIG. 5. Note that in the first exemplary embodiment, the processing section 50 and the switching section 32 are examples of a blocking section.

If a user holding a second mobile device 60 is present within a predetermined distance L2 (see FIG. 4) from the vehicle, the wireless communication section 30 performs wireless communication with the second mobile device 60 which is independent of the communication between the first mobile device 20 and the RF tuner 16. Note that an example of the wireless communication performed between the communication device 22 and the second mobile device 60 is BLE, and the predetermined distance L2 is, for example, 10 m. If the wireless communication performed between the communication device 22 and the second mobile device 60 is BLE, then the communication device 22 and the second mobile device 60 must be paired in advance.

As illustrated in FIG. 5, the wire harness 42 extending from the verification ECU 12 includes two power supply wires (+B, GND) that are used to supply power from the verification ECU 12 to the RF tuner 16, and two signal wires (S0, S1) that are used to perform serial communication between the verification ECU 12 and the RF tuner 16. In the first exemplary embodiment, the communication device 22 that is added between the verification ECU 12 and the RF tuner 16 is connected to the two power supply wires (+B, GND) of the wire harness 42, and operates by means of power supplied via these power supply wires (+B, GND). The switching section 32 is connected to the power supply wire (+B) to switch between interrupting and not interrupting the power supply wire (+B) partway along the length thereof.

As illustrated in FIG. 1, in the same way as the verification ECU 12, the door lock ECU 52 includes a CPU, memory, a storage section, and a communication I/F, and is connected to a door lock ACT (actuator) 54. The door lock ACT 54 is able to switch the door-lock between a locked state and an unlocked state, and operations of the door lock ACT 54 are controlled by the door lock ECU 52.

In the same way as the verification ECU 12 and the like, the starting ECU 56 includes a CPU, memory, a storage section, and a communication I/F. The verification ECU 12 is electrically connected to an engine 58 of the vehicle, and controls starting and like of the engine 58. In the present exemplary embodiment, the vehicle in which this vehicle on-board system 10 is mounted may be a vehicle whose drive source is the engine 58, or maybe a hybrid vehicle (HV). In a vehicle whose drive source is the engine 58, the starting ECU 56, for example, controls fuel injection and the like in the engine 58, while in the case of a hybrid vehicle, the starting ECU 56, for example, controls starting and stopping and the like of the engine 58.

The second mobile device 60 includes a CPU 62, memory 64 such as ROM and RAM, a non-volatile storage section 66 such as an HDD or SSD, a display section 67, a wireless communication section 68, and an acceleration sensor 70. The CPU 62, memory 64, storage section 66, display section 67, wireless communication section 68, and acceleration sensor 70 are connected together to mutually communicate with each other via an internal bus 72. A program that performs wireless communication control processing (described below) is stored in the storage section 66. This program is read from the storage section 66 and expanded in the memory 64, and is then executed by the CPU 62. As a consequence, the CPU 62 functions as an example of a control section.

An example of the wireless communication performed by the wireless communication section 68 is BLE, and the wireless communication section 68 transmits advertising packets periodically to the communication device 22 during periods in which wireless communication is permitted. Note that an example of the second mobile device 60 is a smartphone. Moreover, the acceleration sensor 70 is an example of a displacement detecting section.

Figure 6:
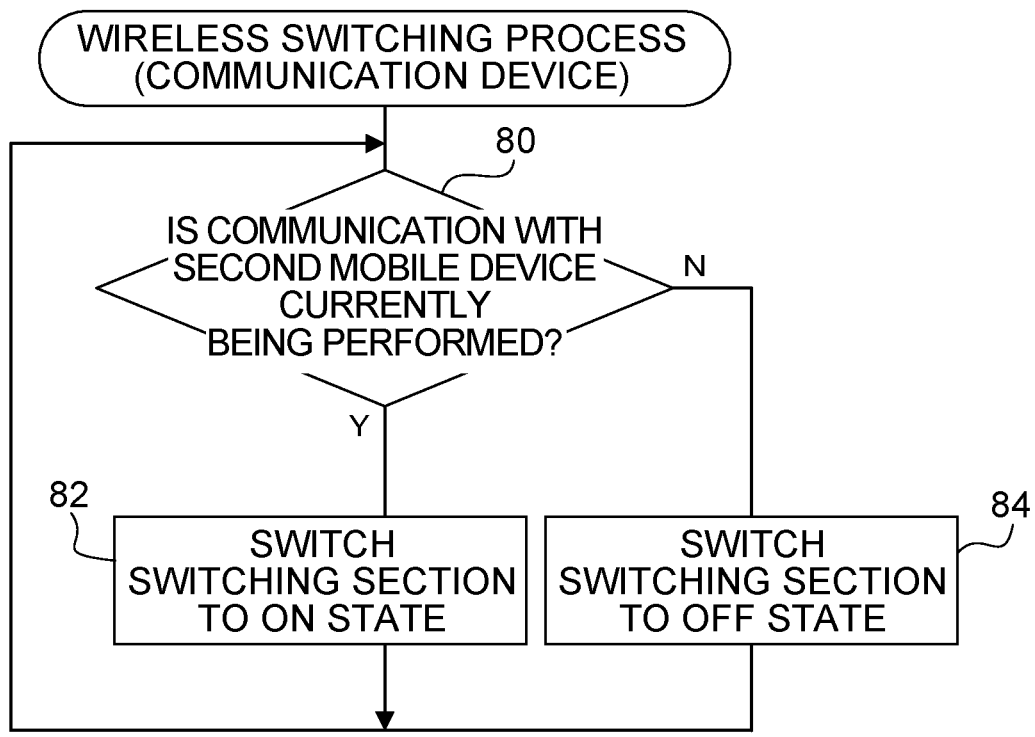
FIG. 6 is a flowchart illustrating wireless switching processing executed by the communication device according to the first exemplary embodiment.

Next, actions of the first exemplary embodiment will be described. In the first exemplary embodiment, the processing section 50 of the communication device 22 performs the wireless switching process illustrated in FIG. 6. In step 80 of the wireless switching process, the processing section 50 determines whether or not the wireless communication section 30 is currently performing wireless communication with the second mobile device 60. If the determination in step 80 is affirmative, the process proceeds to step 82. In step 82, the processing section 50 switches the switching section 32 to an ON state, and then returns to step 80. In this case, the RF tuner 16 is operated as a result of power being supplied from the verification ECU 12 to the RF tuner 16 via the power supply wires (+B, GND).

As a consequence, if a legal user holding the first mobile device 20 and the second mobile device 60 is present within the predetermined distance L1 from the vehicle external LF antennas 14, the key information transmitted from the first mobile device 20 is received by the RF tuner 16, and notification that this key information has been received is issued from the RF tuner 16 to the verification ECU 12. Accordingly, if the key information matches key information in the verification ECU 12, and also the transmission source of the predetermined radio waves is a vehicle external LF antenna 14, then a positive verification notification is issued from the verification ECU 12 to the door lock ECU 52, resulting in the door lock being switched to an unlocked state. Moreover, if the key information matches key information in the verification ECU 12, and also the transmission source of the predetermined radio waves is a vehicle internal LF antenna 18, then a positive verification notification is issued from the verification ECU 12 to the starting ECU 56, with the result that, provided that a start switch (not illustrated in the drawings) of the vehicle has been switched to an ON state, the engine 58 is started by the starting ECU 56.

If the wireless communication section 30 is not currently performing wireless communication with the second mobile device 60, then the determination in step 80 is negative and the process proceeds to step 84. In step 84, the processing section 50 switches the switching section 32 to an OFF state, and returns to step 80. In this case, operations of the RF tuner 16 are stopped as a result of the power supply from the verification ECU 12 to the RF tuner 16 being shut off. Note that, in FIG. 5, the switching of the switching section 32 to the ON state is an example of blocking processing to shut off the power supply to the RF tuner 16.

As a consequence, if a legal user holding the first mobile device 20 and the second mobile device 60 is further than the predetermined distance L2 away from the vehicle, even if key information transmitted from the first mobile device 20 reaches the RF tuner 16 as a result of a stranger performing a first relay attack to illegally relay the radio waves from the first mobile device 20, then because operations are stopped in the RF tuner 16, this key information is not received. Accordingly, because notification that the key information has been received is not issued from the RF tuner 16 to the verification ECU 12, no positive verification notification is issued from the verification ECU 12 to the door lock ECU 52 or the starting ECU 56, so that the door lock is blocked from being switched to an unlocked state and the engine 58 is blocked from being started.

Figure 7:
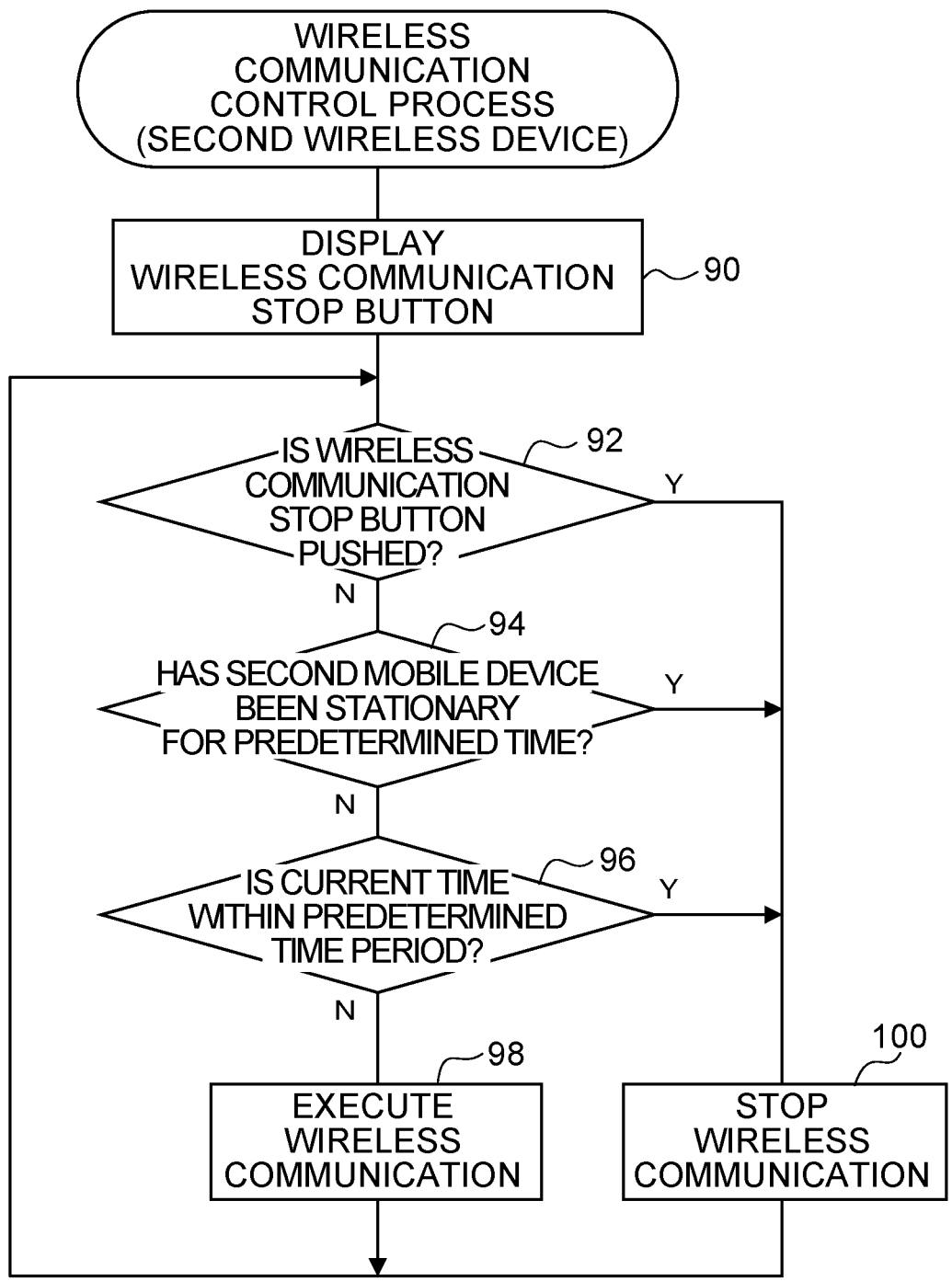
FIG. 7 is a flowchart illustrating wireless communication control processing executed by a second mobile device.

In the second mobile device 60, the wireless communication control process illustrated in FIG. 7 is performed. In step 90, the second mobile device 60 causes a wireless communication stop button, that enables a user to input a command to stop wireless communication by the wireless communication section 68, to be displayed on the display section 67. In step 92, the second mobile device 60 determines whether or not the wireless communication stop button displayed on the display section 67 has been pushed by a user. If the determination in step 92 is negative, the process proceeds to step 94.

In step 94, based on whether or not a state in which an acceleration level detected by the acceleration sensor 70 has remained at 0 for a predetermined time (for example, 30 seconds) or longer, the second mobile device 60 determines whether or not the second mobile device 60 has been stationary for a predetermined time or longer. If the determination in step 94 is negative, the process proceeds to step 96. In step 96, the second mobile device 60 determines whether or not the current time is within a predetermined time period (for example, a late night/early morning time period between 11:00 pm and 6:00 am). If the determination in step 96 is also negative, the process proceeds to step 98. In step 98, the second mobile device 60 performs wireless communication with the communication device 22 using the wireless communication section 68, and the process returns to step 92.

If, on the other hand, the legal user holding the first mobile device 20 and the second mobile device 60 is further than the predetermined distance L2 away from the vehicle, there is a possibility of a stranger performing a second relay attack to illegally relay the radio waves of both the first mobile device 20 and the second mobile device 60. In response to this, in the wireless communication control process, if any of the determinations in steps 92, 94, and 96 are affirmative, the process proceeds to step 100. In step 100, the second mobile device 60 stops the wireless communication being performed by the wireless communication section 68, and the process returns to step 92.

As a consequence, if the wireless communication stop button has been pushed by a user, and if the second mobile device 60 has been stationary for a predetermined time or longer, and if the current clock time is within the predetermined time period, then because wireless communication performed by the second mobile device 60 is stopped, the second relay attack is rendered ineffective, so that the door lock is blocked from being switched to an unlocked state and the engine 58 is blocked from being started.

Note that, in FIG. 5, a configuration is illustrated in which the switching section 32 is connected to the power supply wire (+B) to switch between interrupting and not interrupting the power supply wire (+B) partway along the length thereof, however, the present disclosure is not limited to this. As is illustrated in FIG. 8 as an example, it is also possible for the switching section 32 to instead be connected to the signal wire (S0) to switch between interrupting and not interrupting the signal wire (S0) partway along the length thereof.

In this case, although the RF tuner 16 continues to operate even when the switching section 32 has been switched to the OFF state, because communication between the verification ECU 12 and the RF tuner 16 is blocked, no notification about the key information received by the RF tuner 16 is issued to the RF tuner 16. Accordingly, because no processing to verify the key information is performed in the verification ECU 12, and neither is a positive verification notification issued from the verification ECU 12 to the door lock ECU 52 and the starting ECU 56, the door lock is blocked from being switched to an unlocked state and the engine 58 is blocked from being started.

Figure 8:
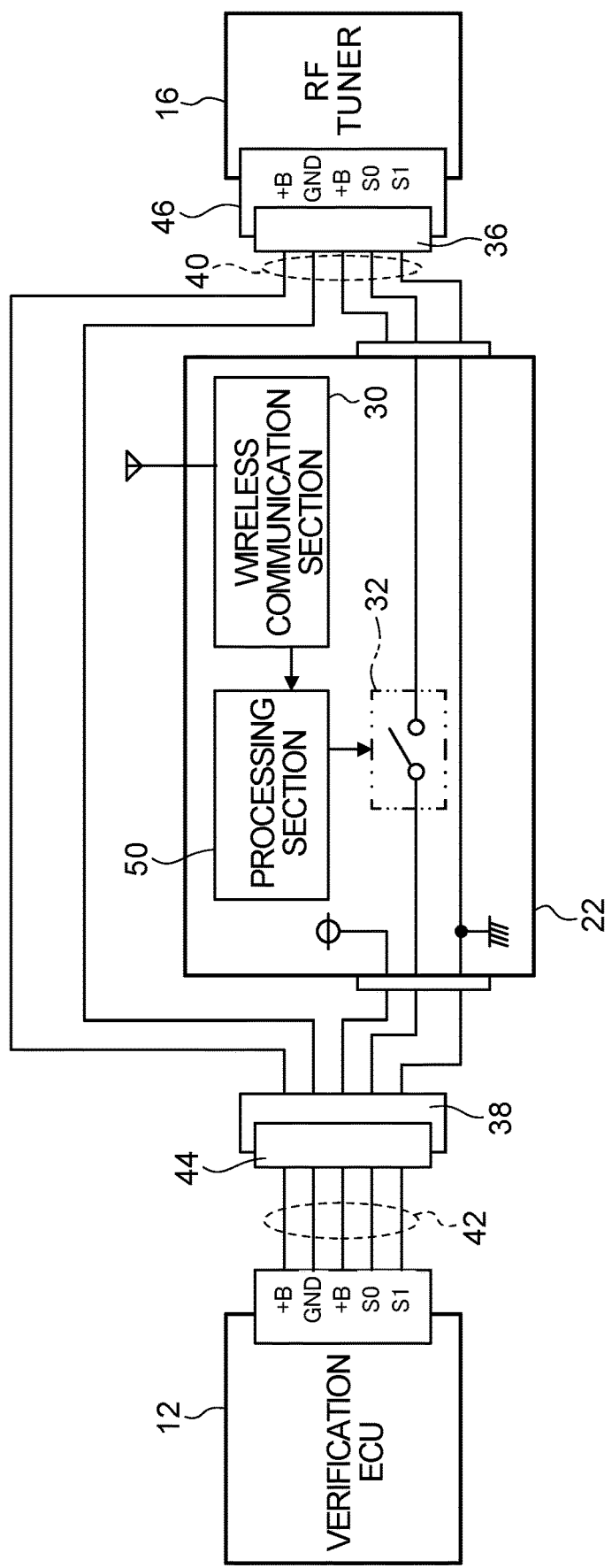
FIG. 8 is a schematic structural view illustrating another configuration of the communication device according to the first exemplary embodiment.

Note that, in the configuration illustrated in FIG. 8, the switching of the switching section 32 to the OFF state is an example of blocking processing to block signals to the RF tuner 16.

Second Exemplary Embodiment

Figure 9:
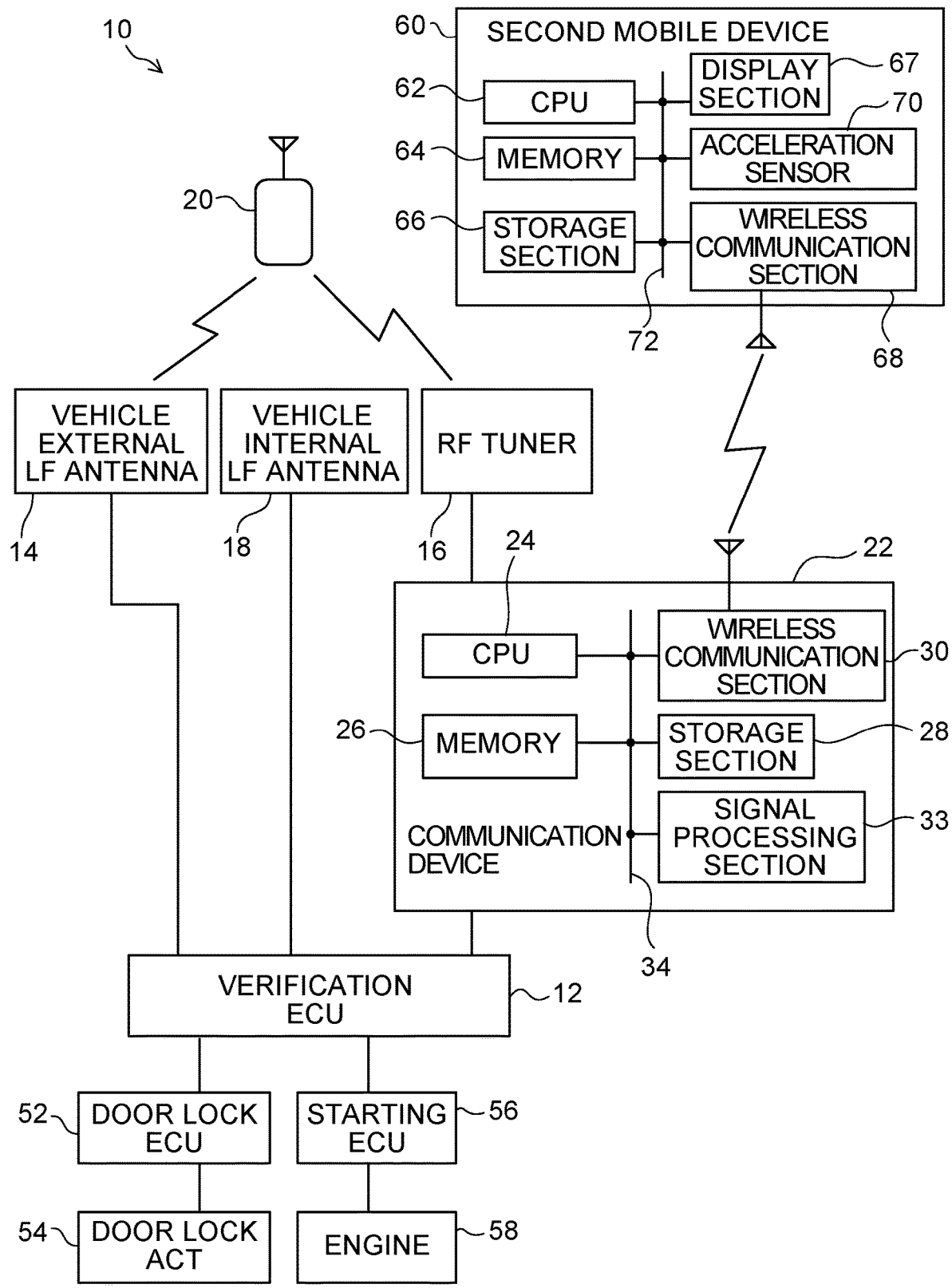
FIG. 9 is a block diagram illustrating a schematic configuration of a vehicle on-board system according to a second exemplary embodiment.

Next, a second exemplary embodiment of the present disclosure will be described. Note that portions that are the same as in the first exemplary embodiment are given the same descriptive symbols and a detailed description thereof is omitted. As is illustrated in FIG. 9, in the communication device 22 according to the second exemplary embodiment, a signal processing section 33 is provided instead of the switching section 32 described in the first exemplary embodiment.

Figure 10:
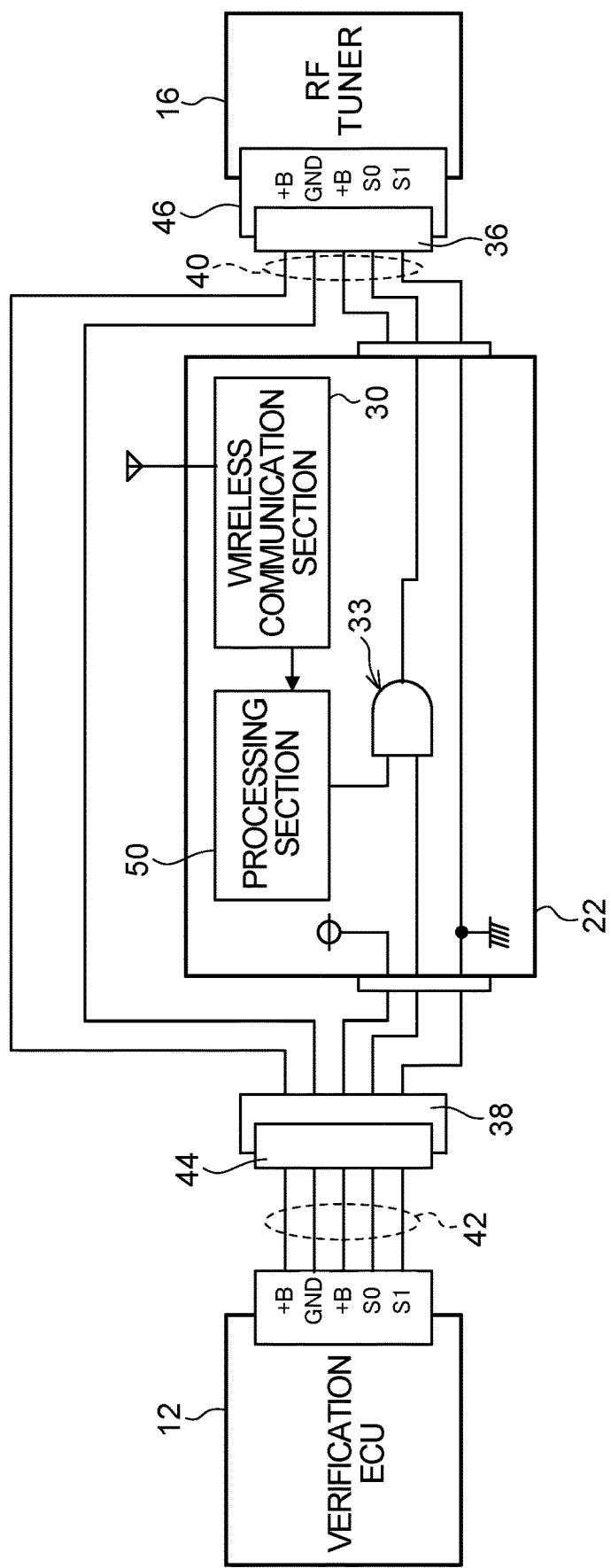
FIG. 10 is a schematic structural view of a communication device according to the second exemplary embodiment.

As is illustrated in FIG. 10, in the second exemplary embodiment, the wire harness 42 extending from the verification ECU 12 includes three power supply wires (two +B and one GND) that are used to supply power from the verification ECU 12 to the RF tuner 16, and two signal wires (S0, S1). In the second exemplary embodiment, the communication device 22 that is added between the verification ECU 12 and the RF tuner 16 is connected to one power supply wire (one +B) of the wire harness 42 and to the two signal wires (S0, S1), and operates by means of power supplied via this power supply wire (+B). The signal processing section 33 is provided partway along the signal wire (S0), and outputs to the RF tuner 16 a signal that corresponds to an AND of the signal traveling from the verification ECU 12 towards the RF tuner 16, and the signal input from the processing section 50. Note that, in the second exemplary embodiment, the processing section 50 and the signal processing section 33 are an example of a blocking section.

Figure 11:
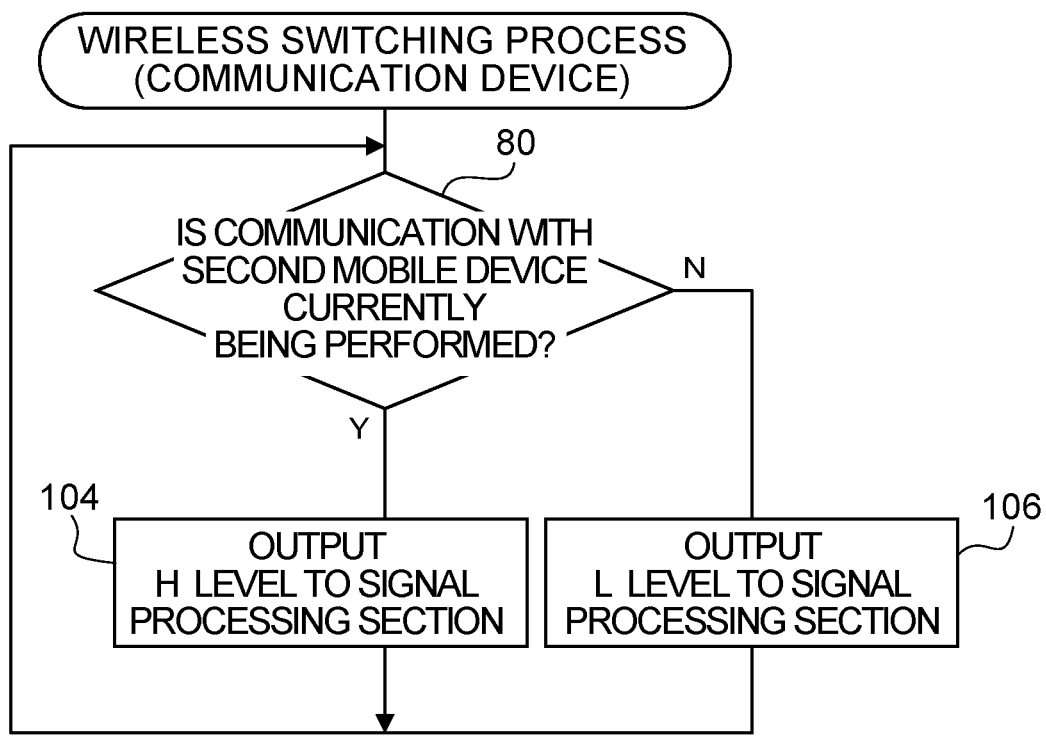
FIG. 11 is a flowchart illustrating wireless switching processing executed by the communication device according to the second exemplary embodiment.

In the second exemplary embodiment, the processing section 50 of the communication device 22 performs the wireless switching processing illustrated in FIG. 11. Namely, when the wireless communication section 30 is performing wireless communication with the second mobile device 60, the determination in step 80 is affirmative, and the process proceeds to step 104. In step 104, the processing section 50 outputs an H (High) level signal to the signal processing section 33, and the process returns to step 80. In this case, as is illustrated in (1) in FIG. 12, the signal output from the verification ECU 12 to the RF tuner 16 is output unmodified.

As a consequence, because communication between the verification ECU 12 and the RF tuner 16 is being performed normally, notification about the key information transmitted from the first mobile device 20 and received by the RF tuner 16 is then issued from the RF tuner 16 to the verification ECU 12. Accordingly, if this key information matches key information in the verification ECU 12, then a positive verification notification is issued from the verification ECU 12 to the door lock ECU 52 or the starting ECU 56.

If the wireless communication section 30 is not currently performing wireless communication with the second mobile device 60, then the determination in step 80 is negative, and the process proceeds to step 106. In step 106, the processing section 50 outputs an L (Low) level signal to the signal processing section 33, and the process returns to step 80. In this case, as is illustrated in (2) in FIG. 12, an L level signal is output from the signal processing section 33 irrespective of the level of the signal output from the verification ECU 12 to the RF tuner 16.

As a consequence, the RF tuner 16 stops operating normally due to the communication between the verification ECU 12 and the RF tuner 16 becoming abnormal. Accordingly, because the processing to verify the key information in the verification ECU 12 is not performed, and no positive verification notification is issued from the verification ECU 12 to the door lock ECU 52 and the starting ECU 56, the door lock is blocked from being switched to an unlocked state and the engine 58 is blocked from being started.

Note that, in the configuration illustrated in FIG. 10, the outputting of an L level signal to the signal processing section 33 is an example of blocking processing performed in order to process signals to the RF tuner 16.

Note also that, in FIG. 10, a configuration in which the signal processing section 33 outputs to the RF tuner 16 a signal that corresponds to an AND of the signal traveling from the verification ECU 12 towards the RF tuner 16, and the signal input from the processing section 50, however, the present disclosure is not limited to this. As is illustrated in FIG. 13 as an example, it is also possible to employ a configuration in which the signal processing section 33 outputs to the verification ECU 12 a signal that corresponds to an AND of the signal traveling from the RF tuner 16 towards the verification ECU 12, and the signal input from the processing section 50

Figure 13:
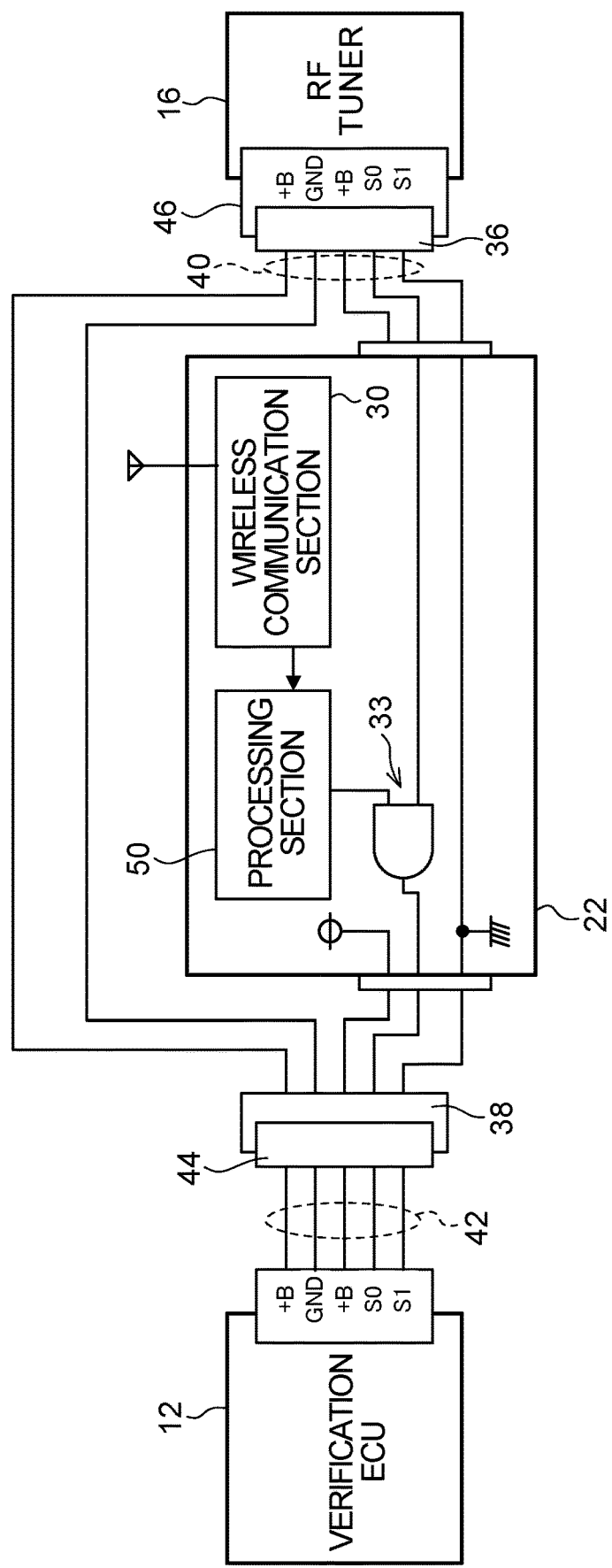
FIG. 13 is a schematic structural view illustrating another configuration of the communication device according to the second exemplary embodiment.

In the configuration illustrated in FIG. 13 as well, when the processing section 50 outputs an L level signal to the signal processing section 33, an L level signal is output from the signal processing section 33 irrespective of the level of the signal output from the RF tuner 16 to the verification ECU 12. As a result, since communication between the verification ECU 12 and the RF tuner 16 becomes abnormal, notification of the key information received by the RF tuner 16 is not sent to the verification ECU 12. Accordingly, because the processing to verify the key information in the verification ECU 12 is not performed, and no positive verification notification is issued from the verification ECU 12 to the door lock ECU 52 and the starting ECU 56, the door lock is blocked from being switched to an unlocked state and the engine 58 is blocked from being started.

Note that, in the configuration illustrated in FIG. 13, the outputting of an L level signal to the signal processing section 33 is an example of blocking processing performed in order to process signals to the verification ECU 12. This processing performed in order to process signals is not limited to AND processing, and may instead be another type of processing such as, for example, OR processing.

Third Exemplary Embodiment

Next, a third exemplary embodiment of the present disclosure will be described. Note that portions that are the same as in the second exemplary embodiment are given the same descriptive symbols and a detailed description thereof is omitted.

Figure 14:
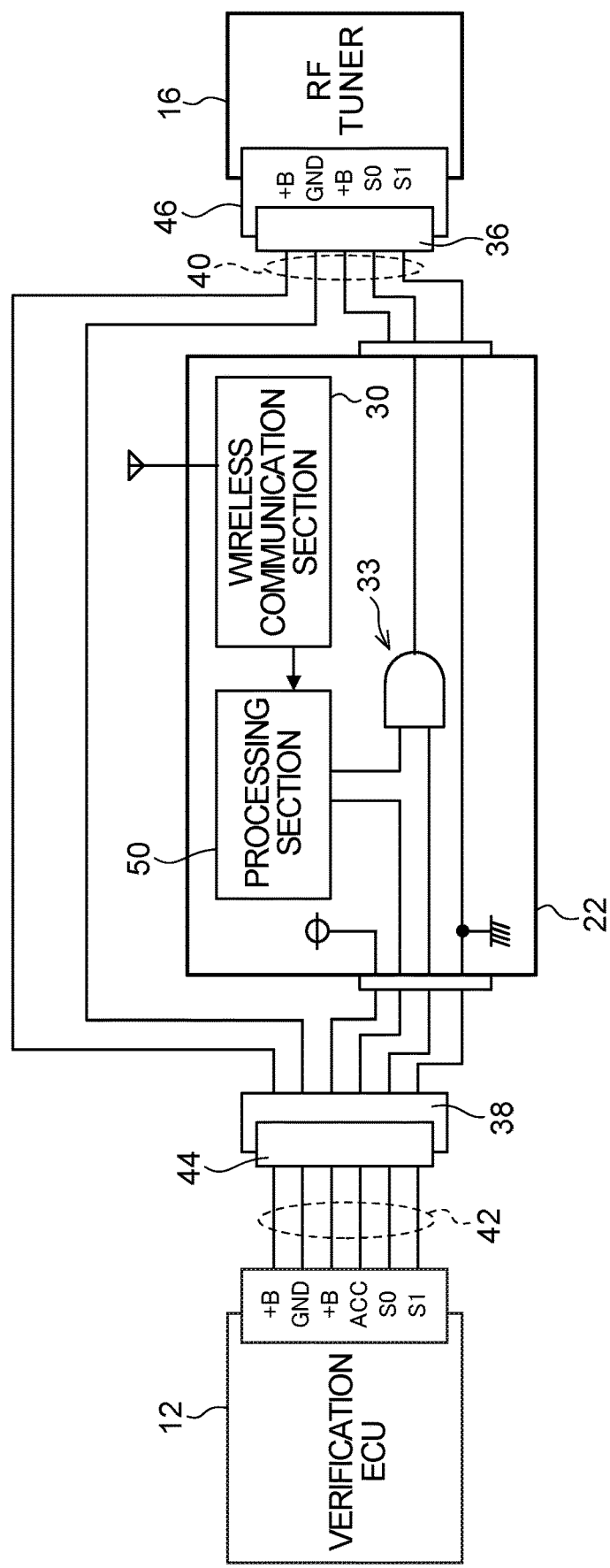
FIG. 14 is a schematic structural view of a communication device according to a third exemplary embodiment.

As is illustrated in FIG. 14, in the third exemplary embodiment, the wire harness 42 extending from the verification ECU 12 includes three power supply wires (two +B and one GND) that are used to supply power from the verification ECU 12 to the RF tuner 16, a vehicle accessory power supply wire (ACC), and two signal wires (S0, S1). In the third exemplary embodiment, the communication device 22 that is added between the verification ECU 12 and the RF tuner 16 is connected to one power supply wire (one +B) of the wire harness 42, to the accessory power supply wire (ACC), and to the two signal wires (S0, S1), and the power supply state of this accessory power supply wire (ACC) is input into the processing section 50.

Figure 15:
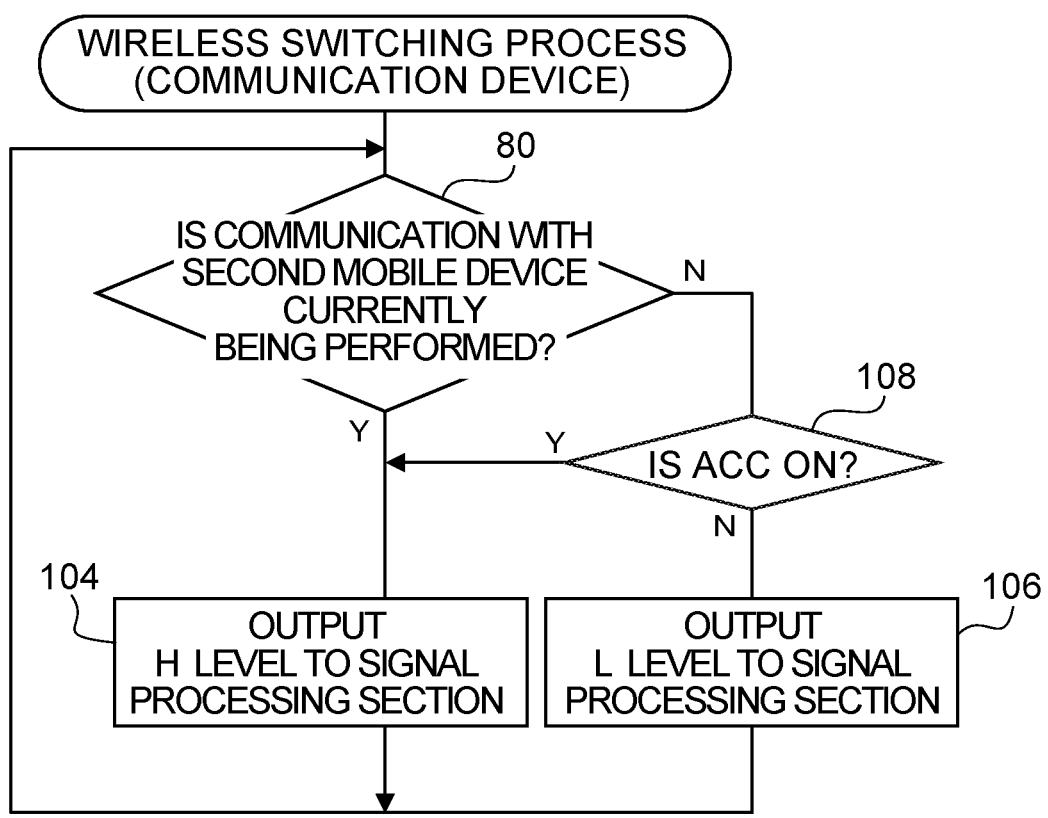
FIG. 15 is a flowchart illustrating wireless switching processing executed by the communication device according to the third exemplary embodiment.

In the third exemplary embodiment, the processing section 50 of the communication device 22 performs the wireless switching process illustrated in FIG. 15. Namely, if the wireless communication section 30 is not currently performing wireless communication with the second mobile device 60, then the determination in step 80 is negative, and the process proceeds to step 108. In step 108, the processing section 50 determines whether or not the accessory power supply (ACC) is in an ON state. If the determination in step 108 is negative, the process proceeds to step 106, and an L (low) level signal is output to the signal processing section 33. In this case, as was described for the second exemplary embodiment, the door lock is blocked from being switched to an unlocked state and the engine 58 is blocked from being started.

On the other hand, if the determination in step 108 is affirmative, then this is because the determination made previously in step 80 was positive, and after the door lock was consequently switched to an unlocked state, and the accessory power supply wire (ACC) was switched to an ON state, communication with the second mobile device 60 was interrupted due to some reason or other. An example of a reason why the communication with the second mobile device 60 might be interrupted is, for example, if the remaining battery capacity of the second mobile device 60 were to drop below a predetermined value. In such a case, it is not necessary for the blocking processing to be executed.

Therefore, in the third exemplary embodiment, if the determination in step 108 is affirmative, the process proceeds to step 104. As a result, even if, after the accessory power supply wire (ACC) has been switched to an ON state, communication with the second mobile device 60 is interrupted, then if a starting switch (not illustrated in the drawings) of the vehicle is subsequently switched OFF so that the accessory power supply wire (ACC) is switched to an OFF state, or until a user alights from the vehicle and the door lock is switched to a locked state, the state in which the blocking processing is not being executed continues unchanged.

As has been described above, in the above-described exemplary embodiments, when communication between the communication device 22 mounted in a vehicle and a second mobile device 60 that is different from the first mobile device 20 which is transmitting key information is interrupted, unlocking of the vehicle or starting of the vehicle based on the received key information is blocked. As a result, because unlocking of the vehicle or starting of the vehicle is contingent not only on the precondition that the key information has been received, but also on the precondition that communication with the second mobile device 60 has not been interrupted, it is possible to inhibit the unlocking of the vehicle or the starting of the vehicle as the result of a first relay attack to relay the radio waves of the first mobile device 20.

Moreover, in the above-described exemplary embodiments, when communication between the communication device 22 and the second mobile device 60 is interrupted, because the communication device 22 performs processing to either shut off the power supply to the RF tuner 16 which receives key information or to the verification ECU 12 which verifies key information, or to block signals thereto, or performs processing on the signals, there is no need to alter the configurations of the existing RF tuner 16 and verification ECU 12, and may inhibit the unlocking of a vehicle or the starting of a vehicle as the result of a relay attack to relay the radio waves of the first mobile device 20 simply by adding the communication device 22.

Moreover, in the above-described embodiments, when communication between the communication device 22 and the second mobile device 60 is interrupted, without performing processing to block the unlocking of a vehicle or the starting of a vehicle based on received key information, when the accessory power supply wire (ACC) of the vehicle has been switched from an OFF state to an ON state, the communication device 22 stops the processing to block the unlocking of a vehicle or the starting of a vehicle based on received key information when communication between the communication device 22 and the second mobile device 60 is interrupted until the power supply state is switched from ON to OFF. As a result, even if, after the accessory power supply wire (ACC) is switched from an OFF state to an ON state, communication with the second mobile device 60 is interrupted due to some reason or other, unnecessary blocking processing is not performed.

Moreover, in the above-described exemplary embodiments, since the communication device 22 is provided between the RF tuner 16 and the verification ECU 12, it is possible to shorten the length of the wire harness 40 in order to add the communication device 22.

Moreover, in the above-described exemplary embodiments, because the first connector 36 that is used for connecting to the RF tuner 16, and the second connector 38 that is used for connecting to the verification ECU 12 are provided in the communication device 22, connecting the communication device 22 may be accomplished by the simple operation of replacing connectors.

Moreover, in the above-described exemplary embodiments, the communicable distance L2 from the communication device 22 to the second mobile device 60 is greater than the communicable distance L1 from the first mobile device 20 to the vehicle interior LF antennas 14, the RF tuner 16, and the vehicle interior LF antennas 18. As a result, the present disclosure may prevent a situation arising in which a vehicle is not unlocked because of communication between the communication device 22 and the second mobile device 60 being interrupted in spite of the fact that the RF tuner 16 is directly receiving key information from the first mobile device 20.

Moreover, in the above-described exemplary embodiments, since the communication between the communication device 22 and the second mobile device 60 is BLE, an extension in the life of a battery mounted in the second mobile device 60 may be achieved.

Moreover, in the above described exemplary embodiments, the second mobile device 60 stops communication between itself and the communication device 22 when predetermined conditions have been met. As a result, the present disclosure may inhibit the unlocking of a vehicle or the starting of a vehicle because of a second relay attack to relay radio waves from the second mobile device 60 in addition to the radio waves from the first mobile device 20.

Moreover, in the above-described exemplary embodiments, communication between the second mobile device 60 and the communication device 22 is stopped when a predetermined button on the second mobile device 60 is pushed. As a consequence, communication with the communication device 22 may be stopped at a desired timing as a result of a user operating a predetermined button.

Moreover, in the above-described exemplary embodiments, the second communication device 60 stops communication between itself and the communication device 22 when an acceleration level detected by the exhilaration sensor 70 has remained at 0 for a predetermined time or greater. As a result, if a user is inactive, such as, for example, when the user is asleep, because button operations and the like are not required, communication with the communication device 22 may be automatically stopped.

Moreover, in the above described exemplary embodiments, since the second mobile device 60 stops communication between itself and the communication device 22 during predetermined time periods, because button operations and the like are not required during time periods when a user is not using a vehicle, such as, for example, at night time and the like, communication with the communication device 22 may be automatically stopped.

Note that it is also possible in the above-described cases, namely, when a predetermined button has been operated, when an acceleration level detected by the exhilaration sensor 70 has remained at 0 for a predetermined time or greater, and during predetermined times periods, for the second mobile device 60 to stop communication between itself and the communication device 22 after having notified the communication device 22 that it intends to stop such communication. By doing this, the communication device 22 side is able to perform the blocking processing at an earlier stage and reliably.

Note also that, in the foregoing description, a case in which the communication device 22 is provided between the verification ECU 12 and the RF tuner 16 has been described. However, the present disclosure is not limited to this, and the communication device 22 may also be provided, for example, between the verification ECU 12 and the door lock ECU 52, or between the verification ECU 12 and the starting ECU 56. Additionally, it is also possible for communication devices 22 to be provided in plural locations.

Moreover, in the foregoing description, a case in which the acceleration sensor 70 is provided as a displacement detecting section has been described. However, the present disclosure is not limited to this, and the displacement detecting section may be a vibration sensor or the like. In addition, the second mobile device 60 is not limited to being a smart phone, and may instead be another type of electronic device.

Moreover, in the foregoing description, a case in which the power supply state of the accessory power supply wire (ACC) is detected as the power supply state of the vehicle has been described. However, the present disclosure is not limited to this, and it is instead possible to detect the power supply state of an ignition power supply wire (IG), or to detect the READY state in the case of a hybrid vehicle.

Exemplary embodiments of the present disclosure have been described above, however, the present disclosure is not limited to these. Various modifications and the like may be made to the present disclosure insofar as they do not depart from the spirit or scope of the present disclosure.

What is claimed is:

1. A communication device mounted at a vehicle, the communication device comprising:
   a blocking section that:
      in a case in which communication with a second mobile device that is different from a first mobile device that transmits key information for the vehicle is interrupted, and communication with the first mobile device is available, performs a blocking process to block an unlocking of the vehicle or a starting of the vehicle that is performed based on received key information, the blocking process being performed based on a state of an accessory power supply provided within the vehicle;
      in a case in which the accessory power supply provided within the vehicle is in an OFF state, executes the blocking process; and
      in a case in which the accessory power supply is in an ON state, does not execute the blocking process.

2. The communication device according to claim 1, wherein, in a case in which communication with the second mobile device is interrupted, the blocking section performs, as the blocking process, any one of shutting off power, shutting off a signal, or processing a signal, in at least one of a receiving device that receives the key information, a verification device that verifies the key information, a first control device that controls unlocking and locking of the vehicle, or a second control device that controls starting of the vehicle.

3. The communication device according to claim 1, wherein, in a case in which a power supply of the vehicle is switched from an OFF state to an ON state without the blocking process having been performed, the blocking section stops the blocking process from being performed until the power supply of the vehicle has been switched from the ON state to the OFF state.

4. The communication device according to claim 2, wherein the communication device is provided between the verification device and at least one of the receiving device, the first control device, or the second control device.

5. The communication device according to claim 4, further comprising:
    a first connector that is used to connect to one of the receiving device, the first control device, or the second control device; and
    a second connector that is used to connect to the verification device.

6. The communication device according to claim 1, wherein a communicable distance with the second mobile device is greater than a communicable distance with the first mobile device.

7. The communication device according to claim 1, wherein communication with the second mobile device is performed via BLE.

8. A communication system comprising:
    the first mobile device, the second mobile device and the communication device that includes the blocking section according to claim 1,
    wherein the second mobile device performs different communication from that performed by the first mobile device.

9. The communication system according to claim 8, wherein the second mobile device includes a control section that stops communication with the communication device when a predetermined condition has been satisfied.

10. The communication system according to claim 9, wherein the control section stops communication with the communication device when a predetermined button at the second mobile device is operated.

11. The communication system according to claim 9, wherein:
    the second mobile device further includes a displacement detecting section that detects a displacement of the second mobile device, and
    the control section stops communication with the communication device when a state in which a displacement of the second mobile device is not detected by the displacement detecting section continues for a predetermined time or greater.

12. The communication system according to claim 9, wherein the control section stops communication with the communication device during a predetermined time period.

13. The communication system according to claim 8, wherein the second mobile device is a smartphone.

14. A communication method comprising:
    in a case in which communication between a vehicle and a second mobile device that is different from a first mobile device that transmits key information for the vehicle is interrupted, and communication with the first mobile device is available, executing a blocking process including blocking an unlocking of the vehicle or a starting of the vehicle that is performed based on received key information, the blocking process being executed based on a state of an accessory power supply provided within the vehicle;
    in a case in which the accessory power supply provided within the vehicle is in an OFF state, executing the blocking process; and
    in a case in which the accessory power supply is in an ON state, performing control to prevent execution of the blocking process.

15. A non-transitory computer readable medium storing a program executable by a computer to perform a process comprising:
    in a case in which communication between a vehicle and a second mobile device, which is different from a first mobile device that transmits key information for the vehicle, is interrupted, and communication with the first mobile device is available, executing a blocking process including blocking an unlocking of the vehicle or a starting of the vehicle that is performed based on received key information, the blocking process being executed based on a state of an accessory power supply provided within the vehicle;
    in a case in which the accessory power supply provided within the vehicle is in an OFF state, executing the blocking process; and
    in a case in which the accessory power supply is in an ON state, performing control to prevent execution of the blocking process.

* * * * *